(12) United States Patent
Ichikawa et al.

(10) Patent No.: US 6,440,022 B1
(45) Date of Patent: Aug. 27, 2002

(54) DOUBLE-MESHING TYPE SILENT CHAIN AND SPROCKET FOR MESHING WITH THE CHAIN ALONG OUTER CIRCUMFERENCE THEREOF

(75) Inventors: Kouichi Ichikawa; Nobuto Kozakura; Tsutomu Haginoya; Toyonaga Saitou, all of Saitama-ken (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/559,252

(22) Filed: Apr. 27, 2000

Related U.S. Application Data

(62) Division of application No. 09/219,860, filed on Dec. 23, 1998, now Pat. No. 6,142,902.

(30) Foreign Application Priority Data

Dec. 25, 1997 (JP) .............................................. 9-357102

(51) Int. Cl.[7] .......................... F16G 13/04; F16H 55/06
(52) U.S. Cl. ........................ 474/213; 474/212; 474/214; 474/161
(58) Field of Search ................................ 474/213, 212, 474/161, 156, 157, 214, 215, 206, 151, 152; D8/499

(56) References Cited

U.S. PATENT DOCUMENTS

| | | | | |
|---|---|---|---|---|
| 1,919,768 A | * | 7/1933 | Brandt | 474/213 |
| 1,956,942 A | * | 5/1934 | Belcher et al. | 474/213 |
| 2,669,879 A | | 2/1954 | Pierce | 74/253 |
| 4,261,214 A | * | 4/1981 | Watanabe et al. | 474/156 |
| 4,332,574 A | * | 6/1982 | Aoyama et al. | 474/161 |
| 4,342,560 A | * | 8/1982 | Ledvina et al. | 474/157 |
| 4,867,733 A | * | 9/1989 | Yamanoi et al. | 474/161 |
| 5,224,903 A | * | 7/1993 | Langhof et al. | 474/161 X |
| 5,360,378 A | * | 11/1994 | Suzuki et al. | 474/161 |
| 5,588,926 A | * | 12/1996 | Mott et al. | 474/212 |
| 5,908,364 A | * | 6/1999 | Tanaka | 474/156 X |
| 5,967,926 A | * | 10/1999 | Kozakura et al. | 474/213 |
| 5,989,140 A | * | 11/1999 | Ichikawa et al. | 474/148 |
| 6,171,209 B1 | * | 1/2001 | Matsuda | 474/212 |

FOREIGN PATENT DOCUMENTS

| | | |
|---|---|---|
| DE | 39 42 761 | 8/1991 |
| DE | 198 09 853 | 9/1998 |
| FR | 443 581 | 5/1912 |

* cited by examiner

*Primary Examiner*—David A. Bucci
*Assistant Examiner*—Marcus Charles
(74) *Attorney, Agent, or Firm*—Armstrong, Westerman & Hattori, LLP

(57) ABSTRACT

A double-meshing-type silent chain includes link plates having the identical side profile. Each link plate has two meshing teeth and a flat back face formed opposite to the meshing teeth. Two kinds of links are alternately arranged in the longitudinal direction of the chain, while the adjacent links are connected by pins. In one kind of link, an odd number of the link plates are disposed in the width direction of the chain. In the other kind of link, an even number of the link plates are disposed in the width direction of the chain. In each link, the link plates are oriented such that the meshing teeth of link plates located at widthwise opposite ends project outwardly with respect to the chain and the meshing teeth of the remaining link plates project inwardly with respect to the chain.

1 Claim, 10 Drawing Sheets

DOUBLE-MESHING TYPE SILENT CHAIN AND SPROCKET FOR MESHING WITH THE CHAIN ALONG OUTER CIRCUMFERENCE THEREOF

This is a division of application Ser. No. 09/219,860 filed Dec. 23, 1998 now U.S. Pat. No. 6,142,902.

BACKGROUND OF THE INVENTION

1. Field of the Invention

The present invention relates to a double meshing-type silent chain capable of meshing with sprockets located inside and outside the chain and to a sprocket for meshing with the chain along the outer circumference thereof.

2. Description of the Related Art

Conventionally, in some cases, a double-meshing-type silent chain capable of meshing with sprockets or toothed pulleys which are mounted on respective driven shafts located inside and outside the chain is used as a timing chain for transmitting rotational motion from the crankshaft of an engine to the cam-shaft of the engine or to the shaft of an auxiliary device such as an oil pump. A double-meshing-type silent chain is employed when driven shafts located inside and outside the chain must be rotated in opposite directions.

FIG. 10 shows a conventional double-meshing-type silent chain. In FIG. 10, an endless chain A1 meshes with a sprocket A2 located inside the chain A1 as well as with a toothed pulley A3 located outside the chain A1.

In the chain A1, links, each composed of three kinds of link plates having different shapes, are connected by pins A4. Specifically, guide link plates A5 are disposed at the widthwise outermost sides of the chain A1 as well as alternately along the longitudinal direction of the chain A1. As shown in FIG. 11, the guide link plate A5 has a straight edge portion a formed at the inner circumferential side of the chain A1 and two small meshing teeth b which are formed at the outer circumferential side of the chain A1 to be located at longitudinally opposite end portions of the guide link plate 5. The small meshing teeth b mesh with the toothed pulley A3.

A link plate A6 is pin-connected with adjacent guide link plates A5 at opposite end portions thereof such that the link plate A6 is in contact with inside faces of the guide link plates A5. The link plate A6 has two meshing teeth c formed at the inner circumferential side of the chain A1 so as to mesh with the sprocket A2, as well as two small meshing teeth b formed at the outer circumferential side of the chain A1 so as to mesh with the toothed pulley A3.

Plates A7 and A8 each have two meshing teeth c formed at the inner circumferential side of the chain A1 so as to mesh with the sprocket A2, as well as a flat back face d formed opposite to the meshing teeth c.

Notably, the meshing teeth c formed at the inner circumferential side of the chain A1 and the teeth of the sprocket A2, which mesh with the meshing teeth c, employ a standard tooth profile. By contrast, the meshing teeth b formed at the outer circumferential side of the chain A1 and the teeth of the toothed pulley A3, which mesh with the meshing teeth b, employ a non-standard tooth profile.

The above conventional double-meshing-type silent chain employs three kinds of link plates having different shapes. Thus, in a step of manufacturing plates, link plate dies corresponding to the different link plate shapes must be used. Also, in an assembling step, a large number of kinds of component parts must be handled and controlled. As a result, manufacturing cost is high.

Also, since the profile of the meshing teeth formed at the outer circumferential side of the chain is smaller than the standard tooth profile, when a large load torque acts on the toothed pulley located outside the chain, the toothed pulley disengages from the chain and slips along the chain. Thus, a maximum torque that can be transmitted to the toothed pulley is smaller than that which can be transmitted to the sprocket located inside the chain. This significantly limits the selection of a device to be driven through engagement with the outer circumference side of the chain.

Further, the guide link plate has no meshing teeth at the inner circumferential side of the chain, but instead has the straight edge portion at the inner circumferential side of the chain. Consequently, the guide link plate is relatively heavy, causing an increase in the weight of the entire chain. This causes an increase in impact energy generated due to meshing engagement between the chain and the sprocket or between the chain and the toothed pulley when the chain travels, resulting in an increase in working noise.

Also, a heavy chain weight causes an increase in tension derived from a centrifugal force produced when the chain travels, accelerating wear of a shoe surface of a chain guide or the like as well as elongation of the chain. Particularly, when such a double-meshing-type silent chain is used as a timing chain for an engine, timing drive of the engine may be adversely effected.

SUMMARY OF THE INVENTION

An object of the present invention is to provide a double-meshing-type silent chain which solves the above-mentioned problems involved in the prior art, enables a reduction in manufacturing cost through improvement of productivity, and enables transmission of a strong driving force between the chain and a sprocket meshed with the chain along the outer circumference thereof.

Another object of the present invention is to provide a sprocket. for meshing with the double-meshing-type silent chain along the outer circumference thereof and for serving as a chain guide to suppress chain vibration.

To achieve the above object, the present invention provides a double-meshing-type silent chain comprising link plates having the identical side profile. Each link plate has two meshing teeth and a flat back face formed opposite to the meshing teeth. Two kinds of links are alternately arranged in the longitudinal direction of the chain, while the adjacent links are connected by pins. In one kind of link, an odd number of the link plates are disposed in the width direction of the chain. In the other kind of link, an even number of the link plates are disposed in the width direction of the chain. In each link, the link plates are oriented such that the meshing teeth of link plates located at widthwise opposite ends project outwardly with respect to the chain and the meshing teeth of the remaining link plates project inwardly with respect to the chain.

In the double-meshing-type silent chain of the present invention, all of the link plates have the identical side profile. Also, the outermost link plates of each link are oriented such that their meshing teeth project outwardly with respect to the chain. Thus, these outwardly projecting meshing teeth are meshed with a sprocket disposed outside the chain to thereby transmit power between the chain and the sprocket.

In each link, all the link plates except the outermost link plates are oriented such that the meshing teeth project inwardly with respect to the chain. These inwardly projecting meshing teeth are meshed with a sprocket disposed inside the chain to thereby transmit power between the chain and the sprocket.

Since all of the link plates have the identical side profile, the link plates can be manufactured through use of a single kind of link plate die. As compared to the case of a conventional chain of this kind composed of link plates having a plurality of side profiles, man-hours required for control of component parts can be reduced, and erroneous assembly can be prevented, thereby greatly improving productivity.

In contrast to the case of a conventional silent chain, large heavy guide plates having no teeth are not used, thereby reducing the weight of the entire chain.

Further, since meshing teeth which project outwardly with respect to the chain are profiled similarly to those which project inwardly with respect to the chain, there can be increased a torque that can be transmitted between the chain and a sprocket disposed outside the chain.

Preferably, the double-meshing-type silent chain of the present invention is such that, in each link, the meshing teeth of some link plates oriented in one direction project beyond the back faces of the remaining link plates oriented in an opposite direction.

In this case, the shoe face of a chain guide or that of a tensioner lever can be brought into slidable contact with the back faces of the plates oriented outwardly with respect to the chain, while the opposite side faces of the shoe are guided along the inside faces of the meshing teeth of the opposed outermost link plates, which meshing teeth project outwardly beyond the plate back faces.

The present invention provides a first-type sprocket for meshing with a double-meshing-type silent chain along the outer circumference thereof, wherein a plate support face is formed in each of sprocket teeth so as to support back faces of link plates which are oriented outwardly with respect to the chain, during the sprocket meshing with link plates whose meshing teeth are oriented outwardly with respect to the chain.

In the first-type sprocket, power transmission is achieved through engagement with the meshing teeth of the outermost link plates in each link. Also, the plate support face formed in each sprocket tooth abuts back faces of link plates which are oriented outwardly with respect to the chain, to thereby partially bear a reaction force of the running chain imposed on sprocket teeth and thus improve sprocket durability. Further, the plate support faces serve as a chain guide for guiding the back faces of link plates to thereby suppress chain vibration.

Since an existing standard sprocket can be used as the first-type sprocket by machining tip portions of sprocket teeth to form the plate support face in each sprocket tooth, the first-type sprocket can be manufactured at low cost and can be used with the double-meshing-type silent chain of the present invention.

The present invention provides a second-type sprocket for meshing with a double-meshing-type silent chain along the outer circumference thereof, comprising a plate-back-face support element and two meshing elements. The plate-back-face support element has a cylindrical surface that abuts flat back faces of link plates which are oriented outwardly with respect to the chain. The meshing elements are integrally coupled with the plate-back-face support element such that the plate-back-face support element is interposed between the meshing elements. Meshing teeth are formed on the circumferences of the meshing elements concentrically with the cylindrical surface of the plate-back-face support element so that the meshing elements can mesh with link plates whose meshing teeth project outwardly with respect to the chain.

In the second-type sprocket, the two meshing elements have meshing teeth which are formed on the circumferences and which are profiled so as to completely mesh with outwardly projecting meshing teeth of the chain. Therefore, when the second-type sprocket is meshed with the outer circumferential side of the double-meshing-type silent chain of the present invention, a large torque can be transmitted therebetween.

Also, in the second-type sprocket, the plate-back-face support element has a continuous cylindrical surface for contact with back faces of link plates. The continuous cylindrical profile establishes continuous and smooth contact with the back faces, thereby significantly suppressing chain vibration and partially bearing a reaction force of the running chain imposed on sprocket teeth to thereby lessen sprocket teeth load. Thus, sprocket durability can be improved.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
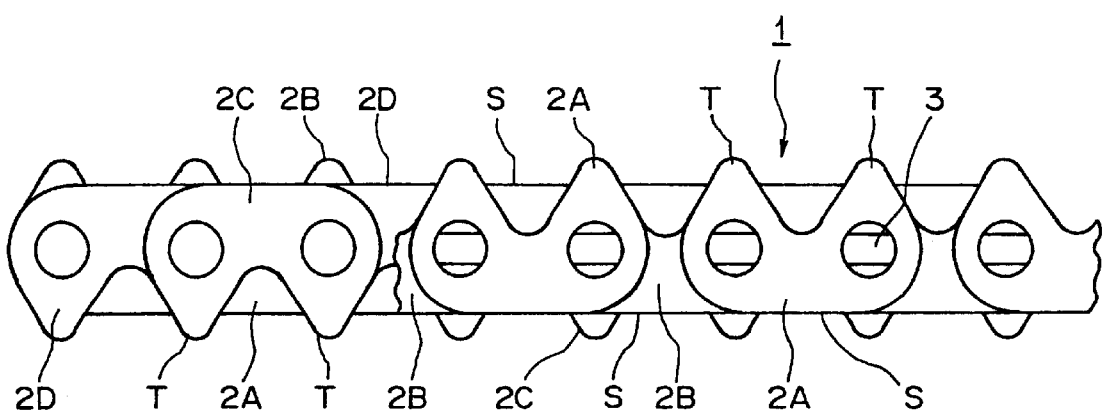
FIG. 1 is a side view showing an embodiment of a double-meshing-type silent chain according to the present invention.
Figure 2:
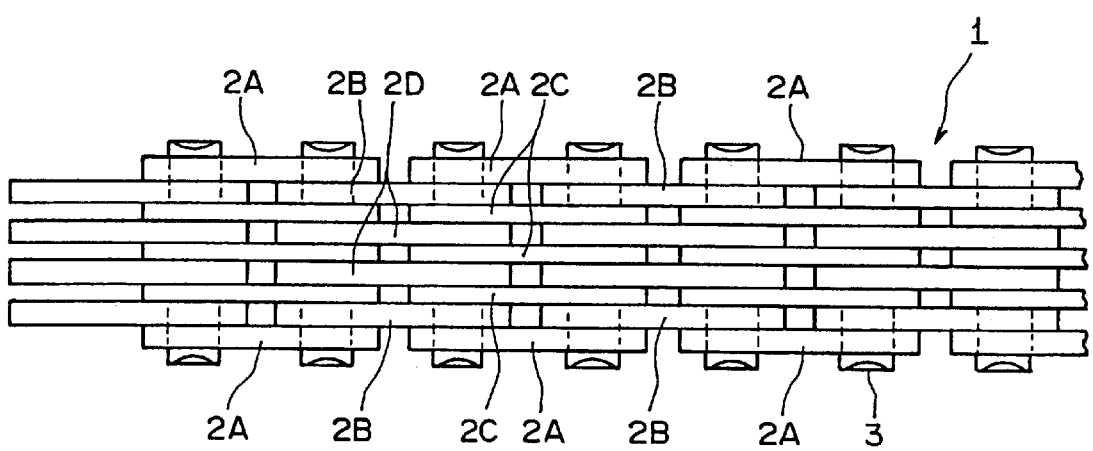
FIG. 2 is a plan view showing the double-meshing-type silent chain of FIG. 1.

Embodiments of the present invention will next be described in detail with reference to the drawings. FIG. 1 is a side view showing an embodiment of a double-meshing-type silent chain according to the present invention. FIG. 2 is a plan view of the silent chain. In FIGS. 1 and 2, a double-meshing-type silent chain (hereinafter, referred to simply as a chain) 1 includes link plates 2A, 2B, 2C, and 2D having the identical side profile.

The link plates 2A, 2B, 2C, and 2D each have two meshing teeth T and a flat back face S formed opposite to the meshing teeth T. The meshing teeth T have a tooth profile similar to that of a standard silent chain.

In the chain 1, two kinds of links are alternately arranged in the longitudinal direction of the chain 1, while the adjacent links are connected by pins 3. One kind of link is composed of an odd number of link plates, specifically three of link plates 2C and two of the link plates 2A which are disposed such that the three link plates 2C are interposed between the two link plates 2A. The other kind of link is composed of an even number of link plates, specifically two of the link plates 2D and two of the link plates 2B which are disposed such that the two link plates 2D are interposed between the two link plates 2B.

The links are connected endlessly, while the outermost link plates 2A and 2B are oriented such that the meshing teeth T project outwardly with respect to the chain 1 and while the link plates 2C and 2D interposed between the link plates 2A and between the link plates 2B, respectively, are oriented such that the meshing teeth T project inwardly with respect to the chain 1.

The link plates 2A and 2B, whose meshing teeth T project outwardly with respect to the chain 1, and the link plate 2D, which is present in the same link as that in which the link plate 2B is present, have the identical thickness. The link plate 2C is thinner than the link plates 2A, 2B, and 2D. Thus, a uniform tensile strength is imparted to the links.

According to the present embodiment, in each link, link plates are connected by the pin 3 such that the meshing teeth T of some link plates oriented in one direction project beyond the back faces S of the remaining link plates oriented in an opposite direction. Thus, the shoe face of a chain guide or tensioner lever can be brought into slidable contact with the back faces S of the link plates 2C and 2D oriented outwardly with respect to the chain 1, while the opposite side faces of the shoe are guided along the inner faces of the meshing teeth T of the opposed outermost link plates 2B, which meshing teeth T project outwardly beyond the plate back faces S of the link plates 2C and 2D.

Also, an unillustrated sprocket located inside and meshed with the chain 1 is guided by the link plates 2B, whose back faces S are oriented inwardly with respect to the chain 1. Specifically, the side faces of sprocket teeth are guided along the inner faces of the opposed link plates 2B. Thus, the link plates 2B serve as guide plates employed in a conventional silent chain.

Notably, in the same link, the link plates 2A (2B) and 2C (2D) may be connected by the pin 3 such that the meshing teeth T of the link plates 2A (2B) are aligned with or recessed from the back faces S of the oppositely oriented link plates 2C (2D). This feature enables a chain guide or a tensioner lever to have a shoe wider than the width of the chain 1.

Figure 3:
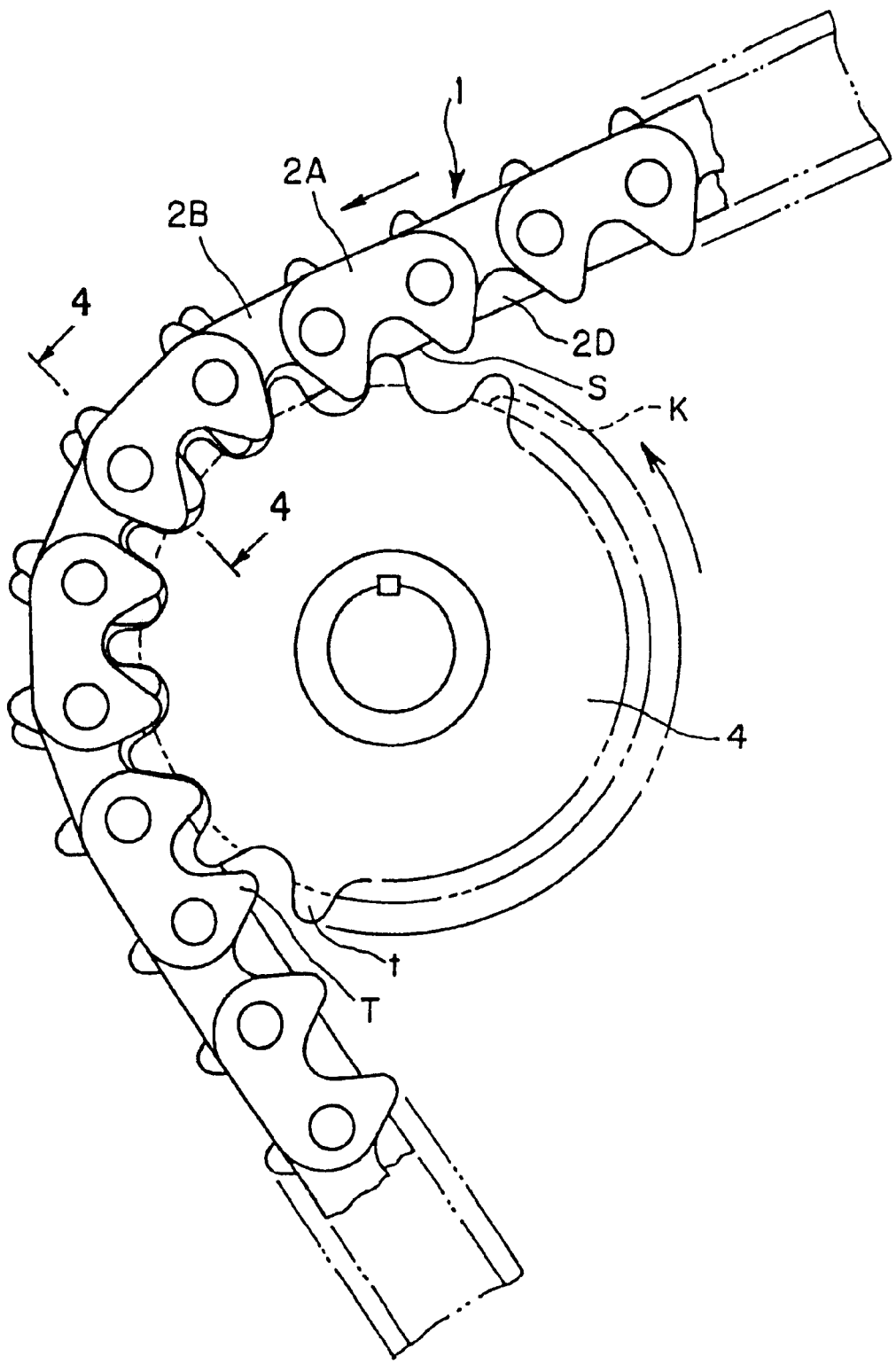
FIG. 3 is a side view showing a first embodiment of a sprocket according to the present invention for meshing with a double-meshing-type silent chain along the outer circumference thereof.
Figure 4:
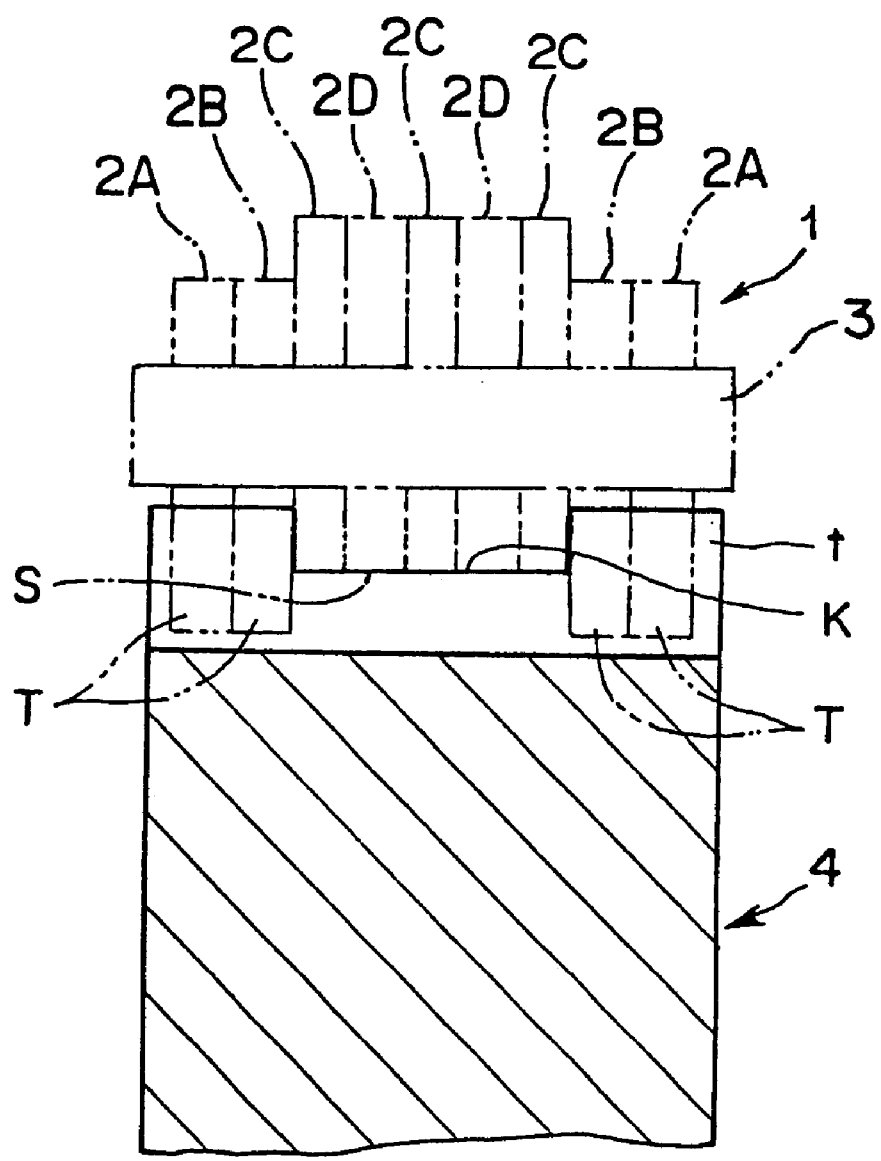
FIG. 4 is a partially sectional view taken along the line A—A of FIG. 3.

FIG. 3 is a side view showing a first embodiment of a sprocket according to the present invention for meshing with a double-meshing-type silent chain along the outer circumference thereof. FIG. 4 is a partially sectional view taken along the line A—A of FIG. 3. As shown in FIGS. 3 and 4, a sprocket 4 according to the first embodiment is disposed outside the chain 1.

Meshing teeth t of the sprocket 4 have a standard tooth profile so as to be compatible with the meshing teeth T of the chain 1. A widthwise central portion of the tip region of each meshing tooth t is cut away to form a plate support face K. The plate support face K is formed as a portion of a cylindrical surface concentric with the rotation axis of the sprocket 4.

The sprocket 4 is slightly wider than the maximum width of the chain 1. An existing standard sprocket having standard teeth for meshing with a silent chain can be readily used as the sprocket 4 by simply machining tip portions of sprocket teeth.

Portions of each meshing tooth t located at opposite sides of the plate support face K mesh with the meshing teeth T of the link plates 2A and 2B disposed at opposite sides of the chain 1, thereby transmitting torque between the chain 1 and the sprocket 4 as in the case of a conventional silent chain.

During such torque transmission, the plate support faces K abut the back faces S of the link plates 2C and 2D to thereby serve as guides for the back faces S. At the same time, torque is partially transmitted between the chain 1 and the sprocket 4 in the form of a frictional force generated between the back faces S and the plate support faces K. Also, the plate support faces K partially bear a reaction force of the running chain 1 imposed on the sprocket teeth, thereby contributing toward improving durability of the sprocket 4.

Figure 5:
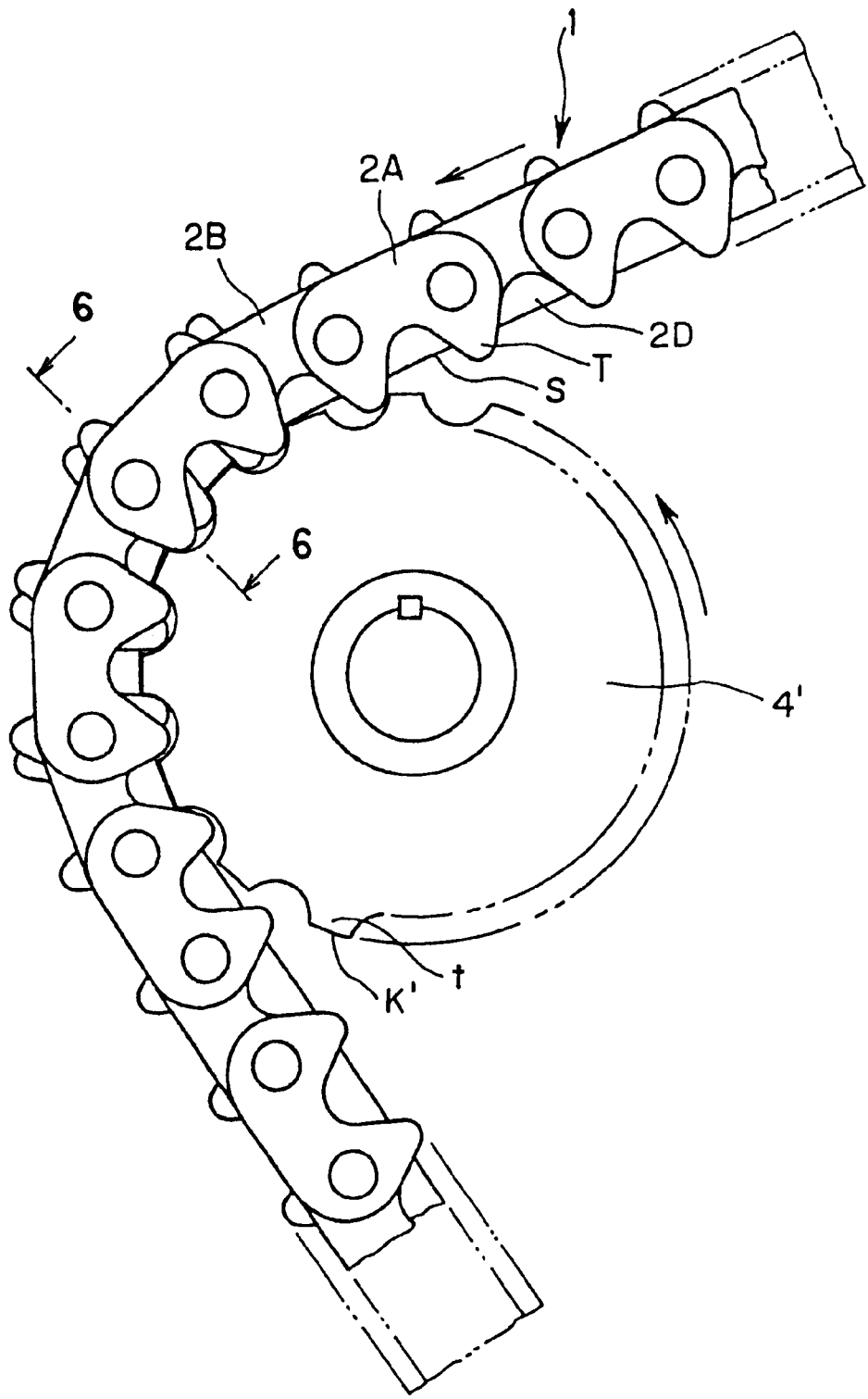
FIG. 5 is a side view showing a second embodiment of the sprocket according to the present invention for meshing with the double-meshing-type silent chain along the outer circumference thereof.
Figure 6:
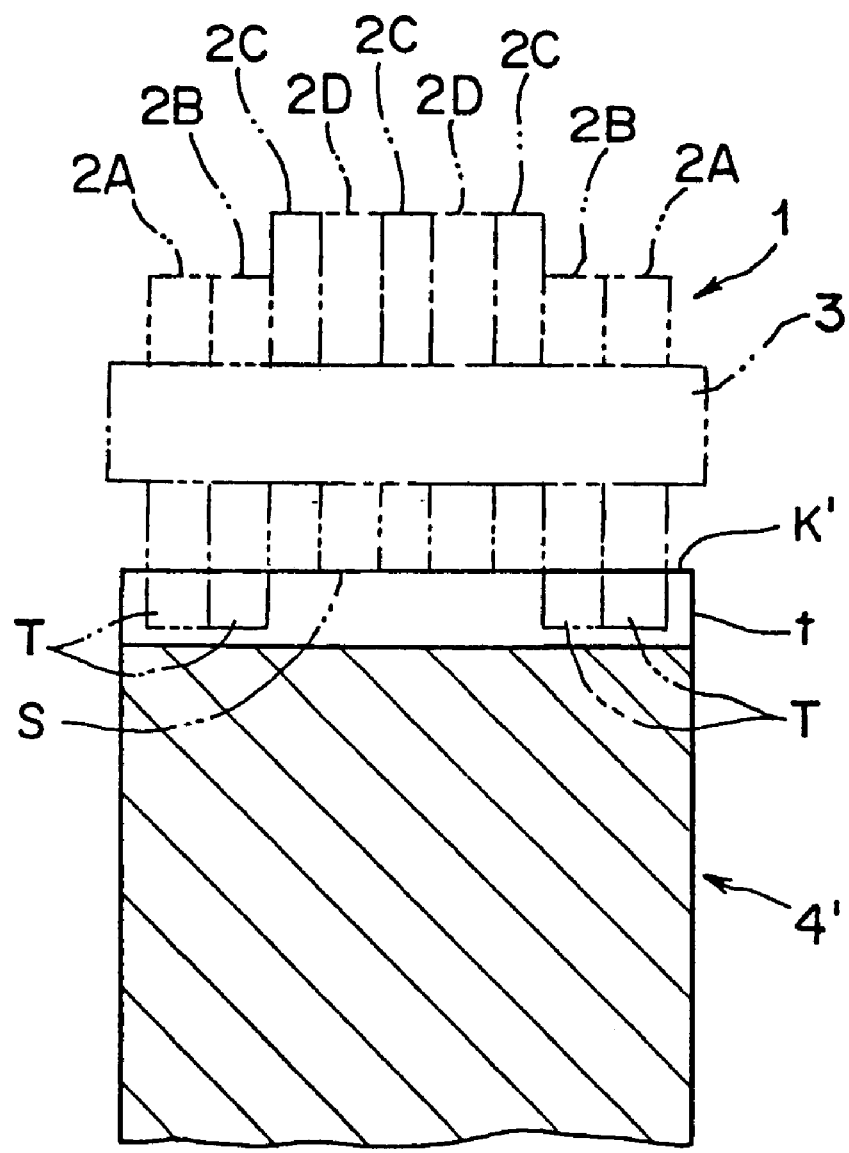
FIG. 6 is a partially sectional view taken along the line B—B of FIG. 5.

FIG. 5 is a side view showing a second embodiment of the sprocket according to the present invention for meshing with a double-meshing-type silent chain along the outer circumference thereof. FIG. 6 is a partially sectional view taken along the line B—B of FIG. 5. As shown in FIGS. 5 and 6, in a sprocket 4' according to the second embodiment, a plate support face K', which abuts the back faces S of the link plates 2C and 2D, is formed on each of meshing teeth t of the sprocket 4' at a tip portion across the entire width of the meshing tooth t. As in the case of the sprocket 4, an existing standard sprocket having standard teeth for meshing with a silent chain can be used as the sprocket 4' by simply machining tip portions of sprocket teeth over the entire teeth width.

Figure 7:
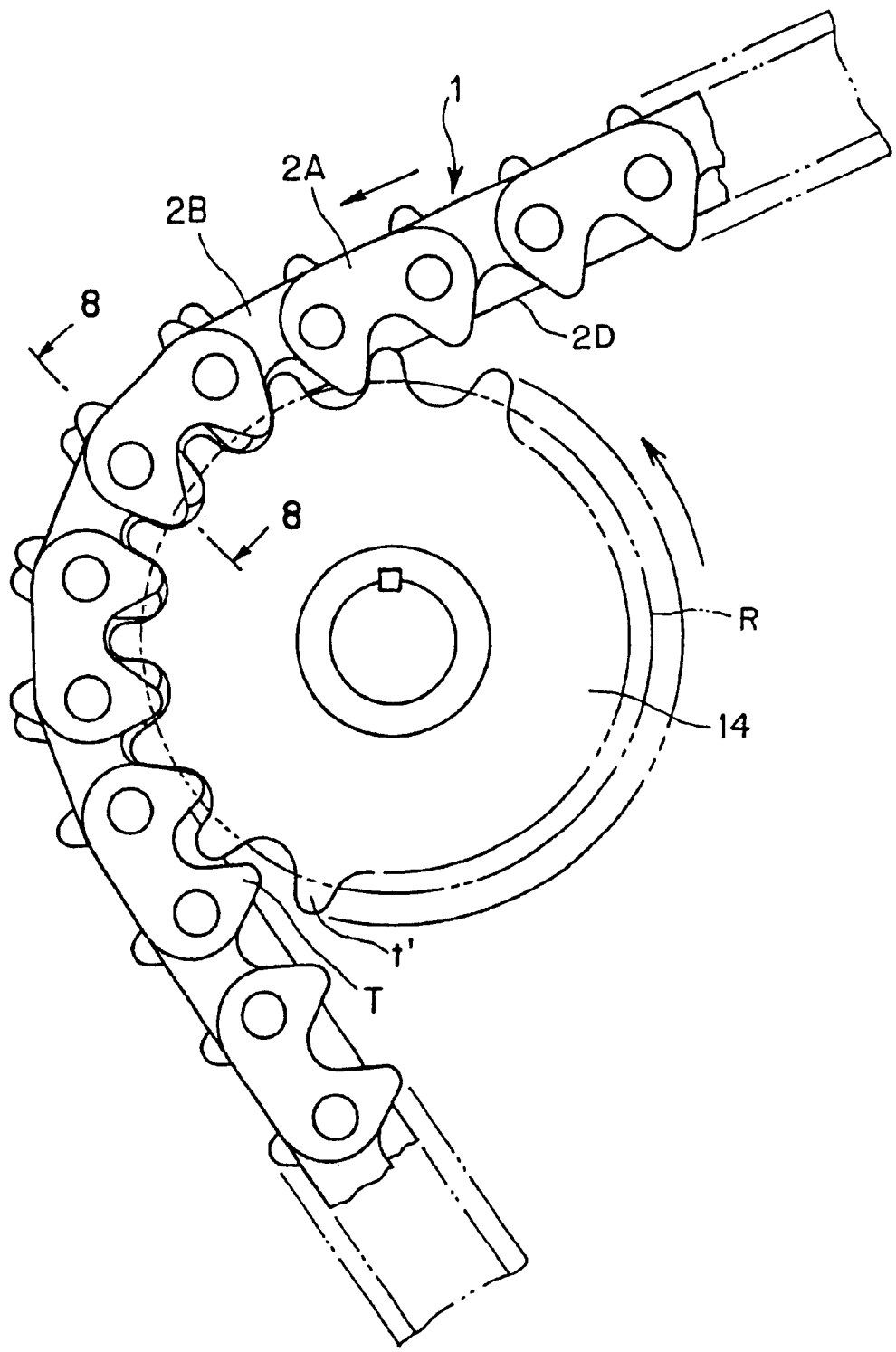
FIG. 7 is a side view showing a third embodiment of the sprocket according to the present invention for meshing with a double-meshing-type silent chain along the outer circumference thereof.
Figure 8:
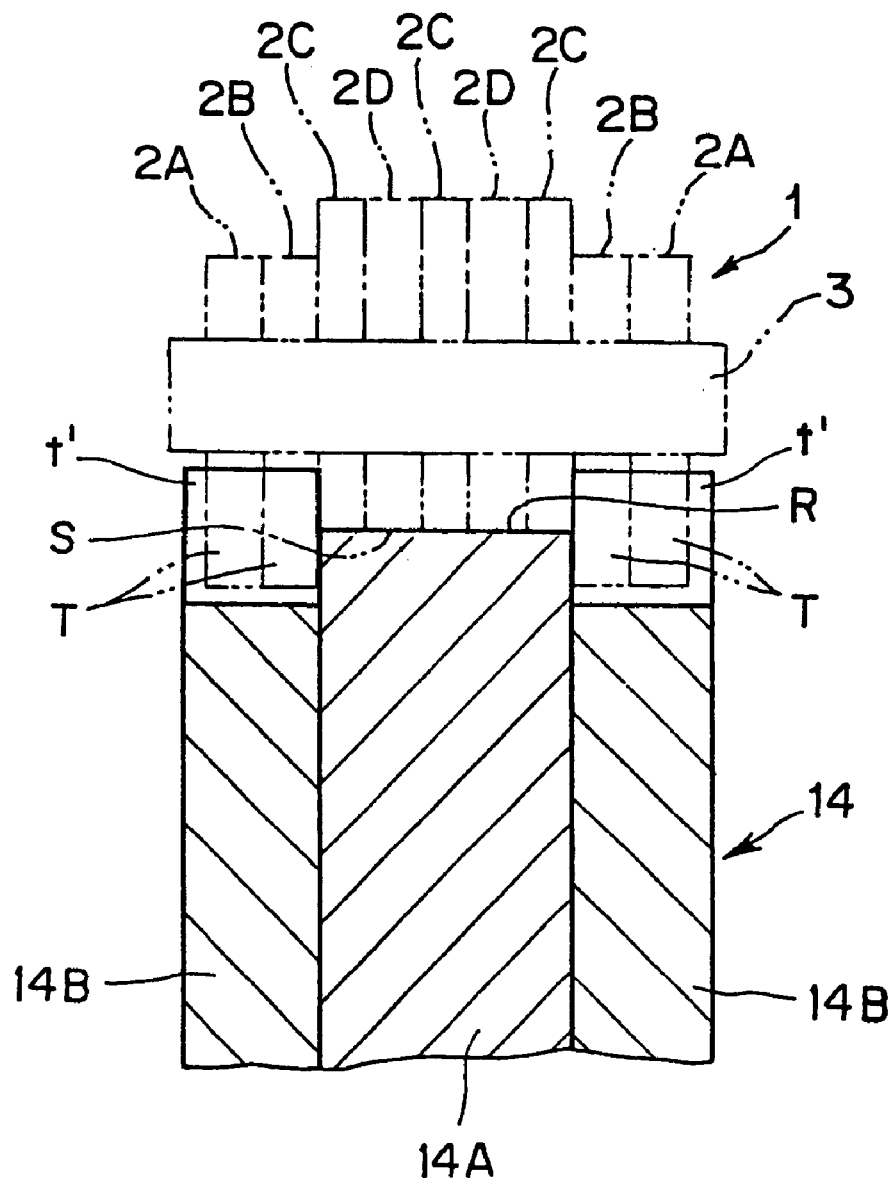
FIG. 8 is a partially sectional view taken along the line C—C of FIG. 7.

FIG. 7 is a side view showing a third embodiment of the sprocket according to the present invention for meshing with a double-meshing-type silent chain along the outer circumference thereof. FIG. 8 is a partially sectional view taken along the line C—C of FIG. 7. As in the case of the sprocket 4, a sprocket 14 according to the third embodiment is meshed with the chain 1 along the outer circumference thereof.

The sprocket 14 is composed of a plate-back-face support element 14A and two meshing elements 14B. The plate-back-face support element 14A has a cylindrical surface R for abutting the back faces S of the link plates 2C and 2D which are oriented outwardly with respect to the chain 1. The plate-back-face support element 14A is interposed between and coaxially coupled with the two meshing elements 14B by means of, for example, unillustrated screws so that the plate-back-face support element 14A and the two meshing elements 14B rotate as a single unit.

Meshing teeth t' are formed on the two meshing elements 14B along the outer circumferences such that the meshing teeth t' of one meshing element 14B are arranged in the same phase as that of the meshing teeth t' of the other meshing element 14B. The meshing teeth t' have a standard tooth profile of a conventional sprocket for use with a silent chain so as to mesh with the meshing teeth T of the outermost link plates 2A and 2B of the chain 1.

Thus, the state of engagement between a conventional silent chain and a sprocket can be similarly established between the meshing teeth t' and the outwardly projecting meshing teeth T of the chain 1 to thereby enable transmission of strong torque therebetween.

While the meshing elements 14B are meshed with the chain 1, the cylindrical surface R of the plate-back-face support element 14A abuts the back faces S of the link plates 2C and 2D so as to guide and support the back faces S. At the same time, a frictional force generated between the back faces S and the cylindrical surface R establishes auxiliary torque transmission between the chain 1 and the sprocket 14.

Notably, in the sprocket 14, only the two meshing elements 14B may be made of metal such as steel, and the plate-back-face support element 14A is made of a resin material. In this case, the resin material absorbs impact which is generated between the cylindrical surface R of the plate-back-face support element 14A and the back faces S of the link plates 2C and 2D due to meshing between the sprocket 14 and the chain 1. Thus, meshing noise can be reduced.

When the plate-back-face support element 14A is to be made of a metallic material, the plate-back-face support element 14A and the meshing elements 14B may be integrally manufactured into a single unit by a method in which a metallic power is compacted and then sintered.

Figure 9:
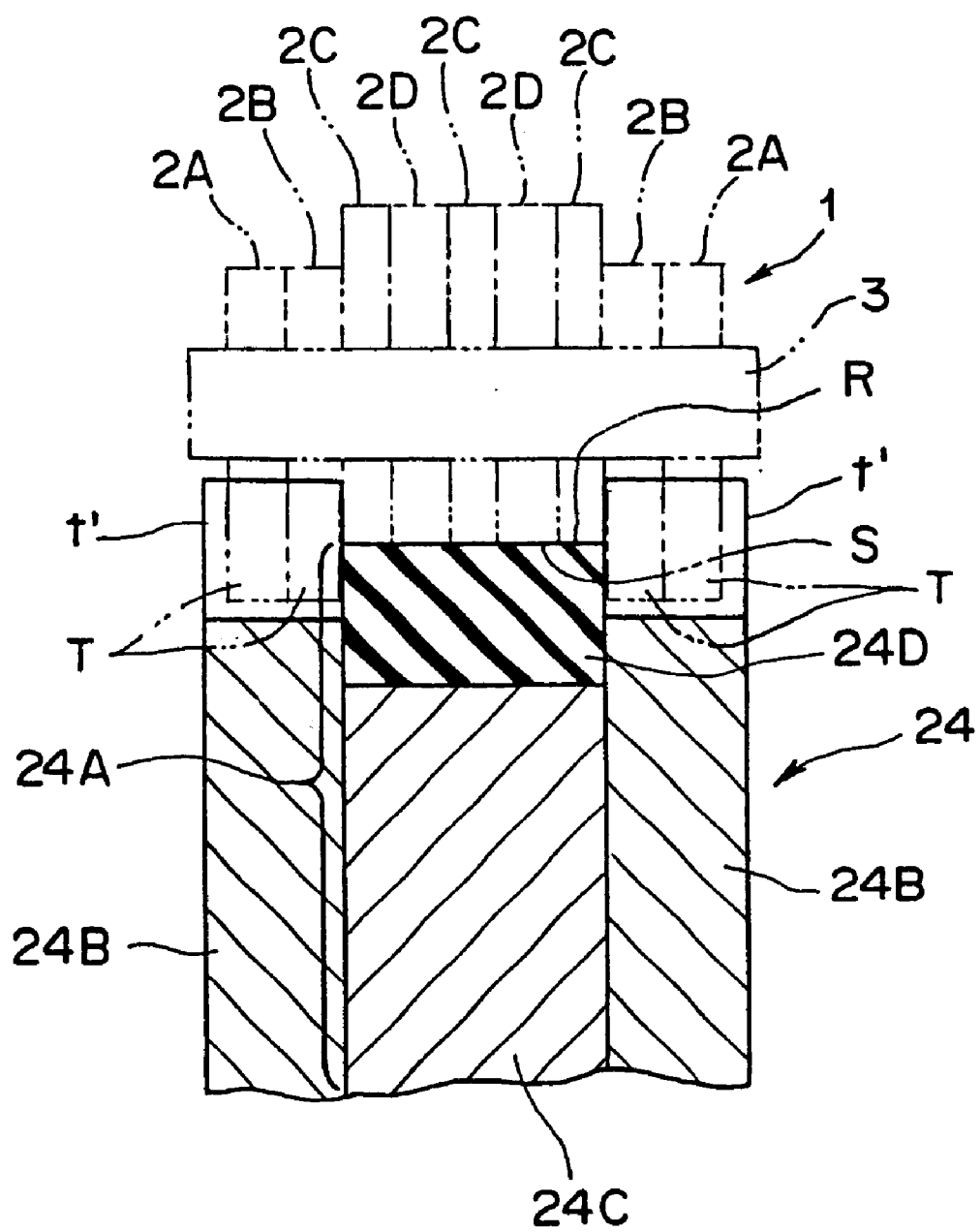
FIG. 9 is a partially sectional view showing a fourth embodiment of the sprocket according to the present invention for meshing with a double-meshing-type silent chain along the outer circumference thereof.
Figure 10:
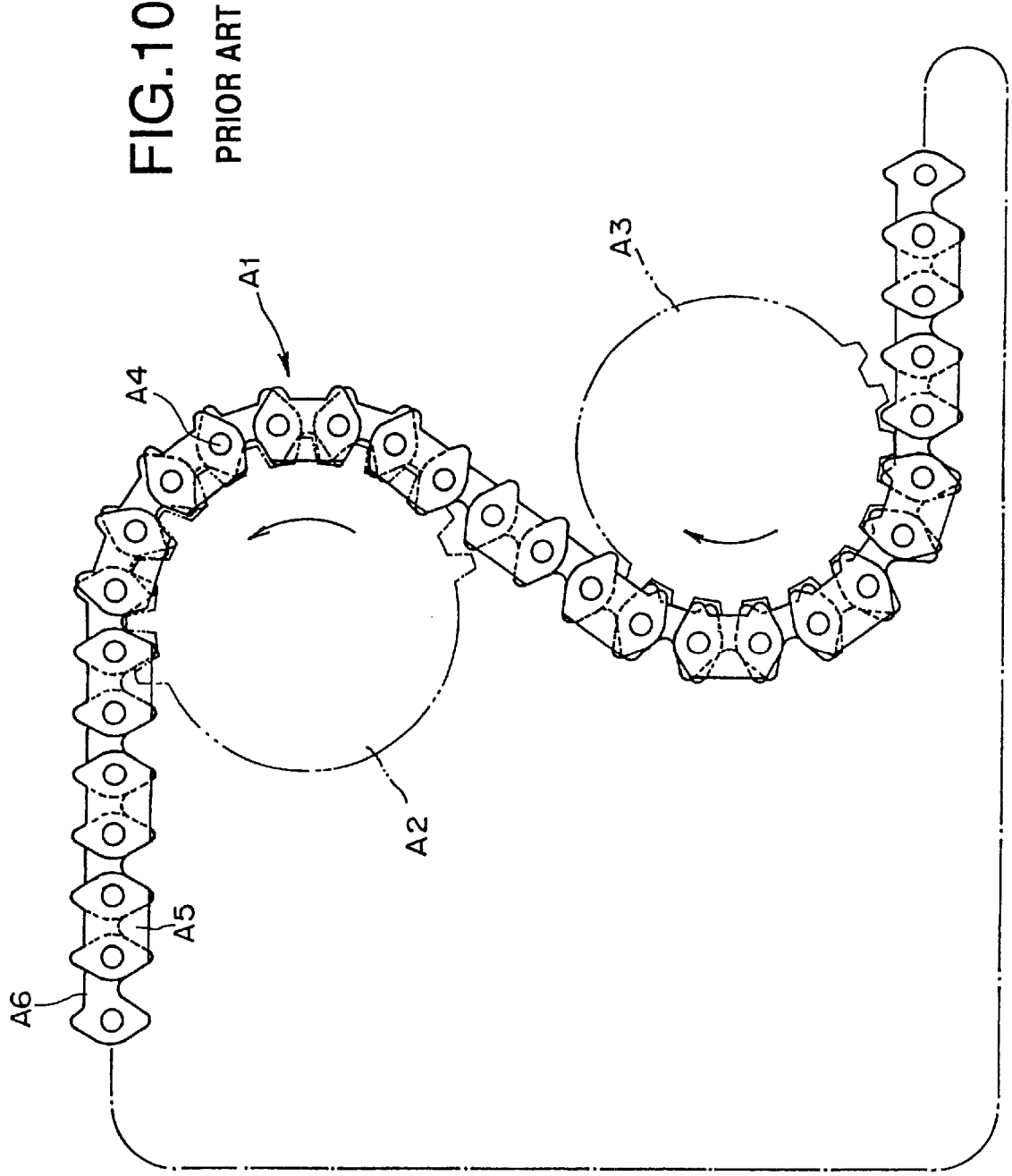
FIG. 10 is a view showing a conventional double-meshing-type silent; chain.
Figure 11:
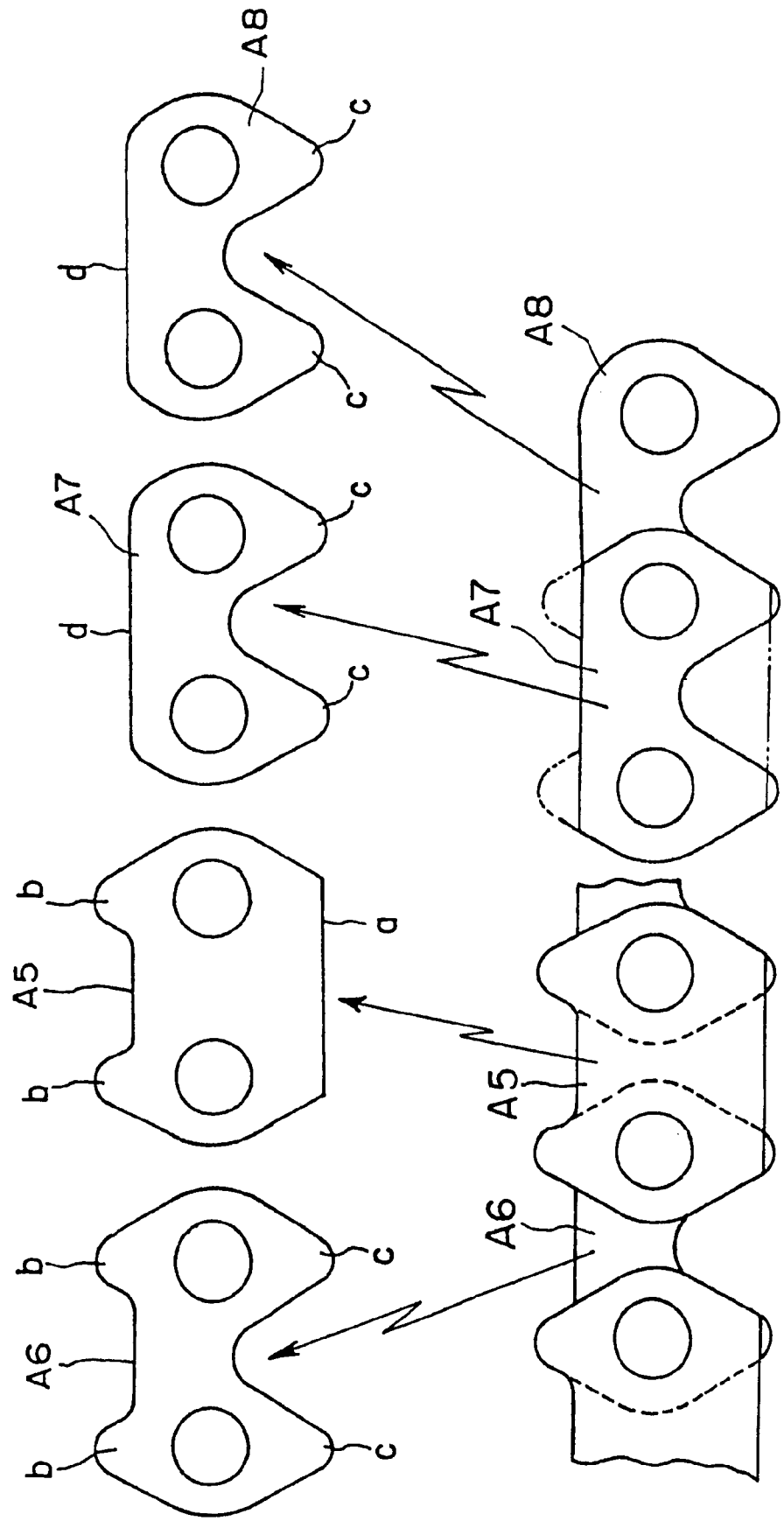
FIG. 11 is a view showing a link plate configuration of the silent chain of FIG. 10.

FIG. 9 is a partially sectional view showing a fourth embodiment of the sprocket according to the present invention for meshing with a double-meshing-type silent chain along the outer circumference thereof. A sprocket 24 of the fourth embodiment as shown in FIG. 9 is different from the sprocket 14 of the third embodiment only in the structure of a plate-back-face support element.

Specifically, in the sprocket 24, a plate-back-face support element 24A is composed of a cylindrical base 24C made of steel and a buffer ring 24D made of rubber. The buffer ring 24D has a cylindrical surface R for abutting the back faces S of the link plates 2C and 2D.

Two meshing members 24B, between which the plate-back-face support element 24A is interposed, have the identical shape as that of the meshing members 14B of the sprocket 14.

While the sprocket 24 is meshed with the chain 1, the back faces S of the link plates 2C and 2D abut the cylindrical surface R of the buffer ring 24D, thereby yielding large impact-absorbing effect as well as noise-absorbing effect. Thus, vibrations of the chain 1 can be suppressed, and large noise reduction effect can be yielded.

Since large friction is generated between the back faces S of the link plates 2C and 2D and the cylindrical surface R of the buffer ring 24D, there can be increased auxiliary torque transmission between the back faces S and the cylindrical surface R. Thus, through torque transmission between the meshing elements 24B and the link plates 2A and 2B as well as the auxiliary torque transmission, strong torque can be transmitted between the chain 1 and the sprocket 24.

In the sprocket 24, in order to reduce the number of component parts and assembling man-hours, either one of the meshing elements 24B may be integrally formed with the cylindrical base 24C, and the other meshing element 24B may be manufactured independently.

Obviously, numerous modifications and variations of the present invention are possible in light of the above teachings. It is therefore to be understood that within the scope of the appended claims, the present invention may be practiced otherwise than as specifically described herein.

What is claimed is:

1. A double-meshing silent chain assembly, comprising in combination:

a double meshing silent chain comprised of a number of interleaved link plates each having two meshing teeth formed at one side and a flat back face formed at the opposite side, the link plates being oriented such that the meshing teeth of first link plates located at widthwise opposite ends project outwardly with respect to the chain beyond the back faces of the remaining link plates and the meshing teeth of the remaining link plates project inwardly with respect to the chain beyond the back faces of the first link plates; and a sprocket comprising:

a first outer circumferential portion and second outer circumferential portions disposed on opposite sides of said first portion, said first outer circumferential portion and said second outer circumferential portions being formed on a one-piece-cylindrical sprocket body;

a cylindrical support face formed on said first outer circumferential portion of said sprocket for supporting thereon the back faces of the remaining link plates of the double-meshing silent chain;

phased rows of evenly spaced sprocket teeth formed on the respective second outer circumferential portions of said sprocket for meshing engagement with the meshing teeth of the first link plates of the double-meshing silent chain, and a row of evenly spaced teeth on said first outer circumferential portion which are formed integrally with said phase rows of meshing teeth on said second outer circumferential portions, and respective tip portions of the teeth formed on said first and second outer circumferential portion are removed across the entire teeth width to form said cylindrical support face on said first outer circumferential portion.

* * * * *